4 Sheets. Sheet. 1.
J. P. Manny,
Harvester Rake.
No. 3581. Reissued Aug. 3. 1869
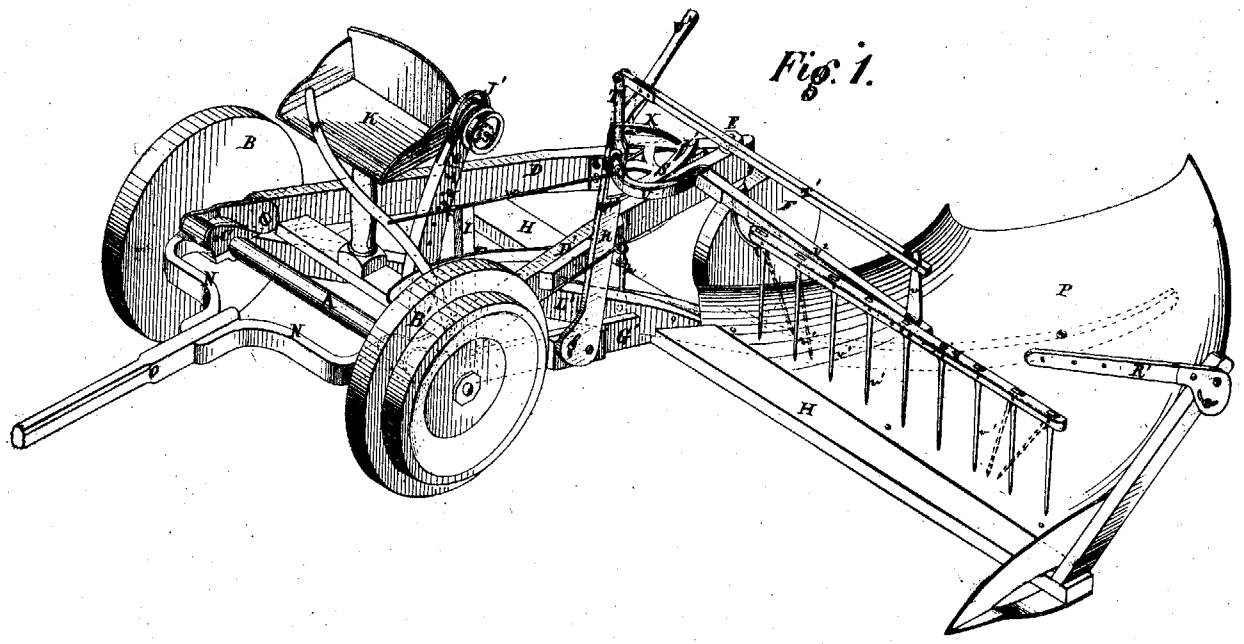
Witnesses.
Geo. S. Peyton.
Baltis D. Long.
John P. Manny
by his Atty
Geo. W. Baldwin 4 Sheets. Sheet. 2.
J. P. Manny,
Harvester Rake.
No. 3581. Reissued. Aug. 3. 1869.
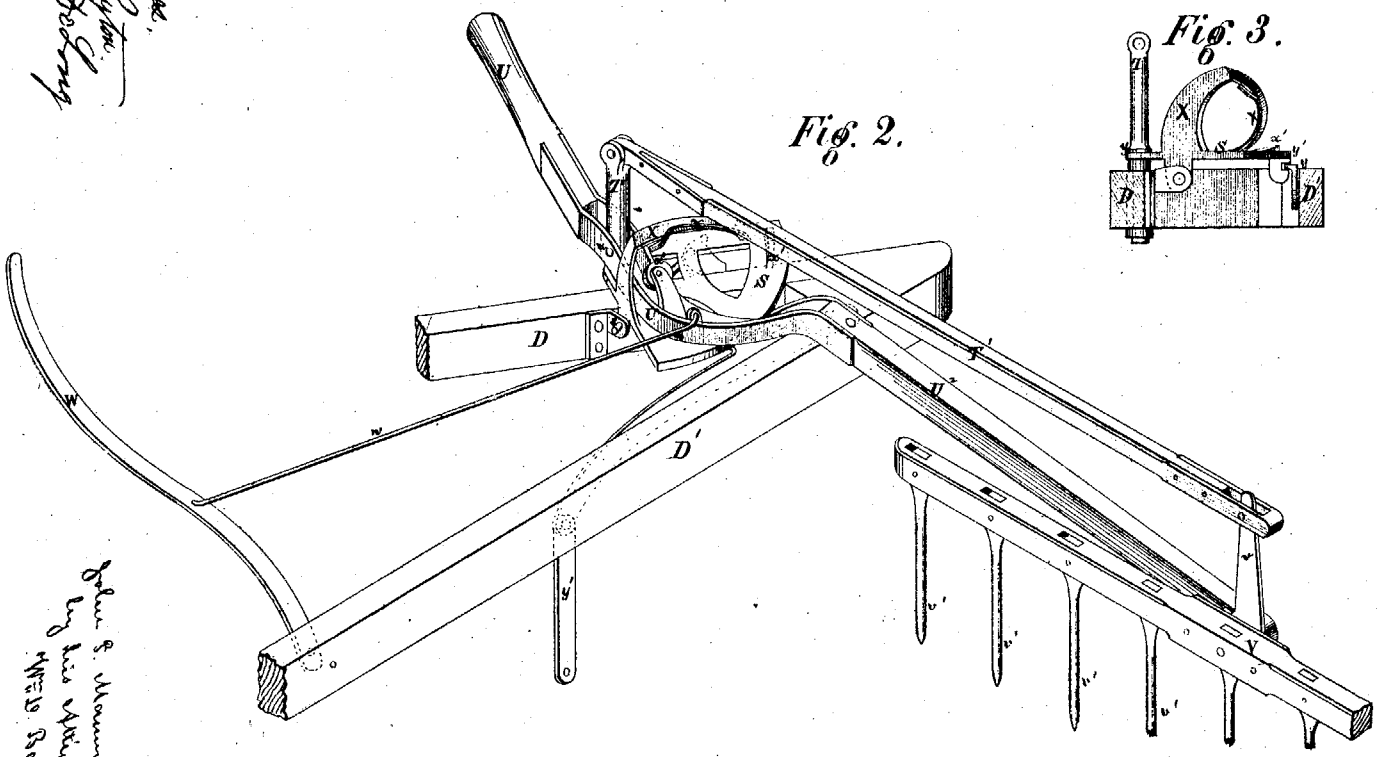
Witnesses,
Joel S. Peyton.
Battis DeLong
John P. Manny
by his Atty
Wm. W. Baldwin 4 Sheets. Sheet 3.
J. P. Manny.
Harvester Rake.
No. 3581.
Reissued. Aug. 3. 1869
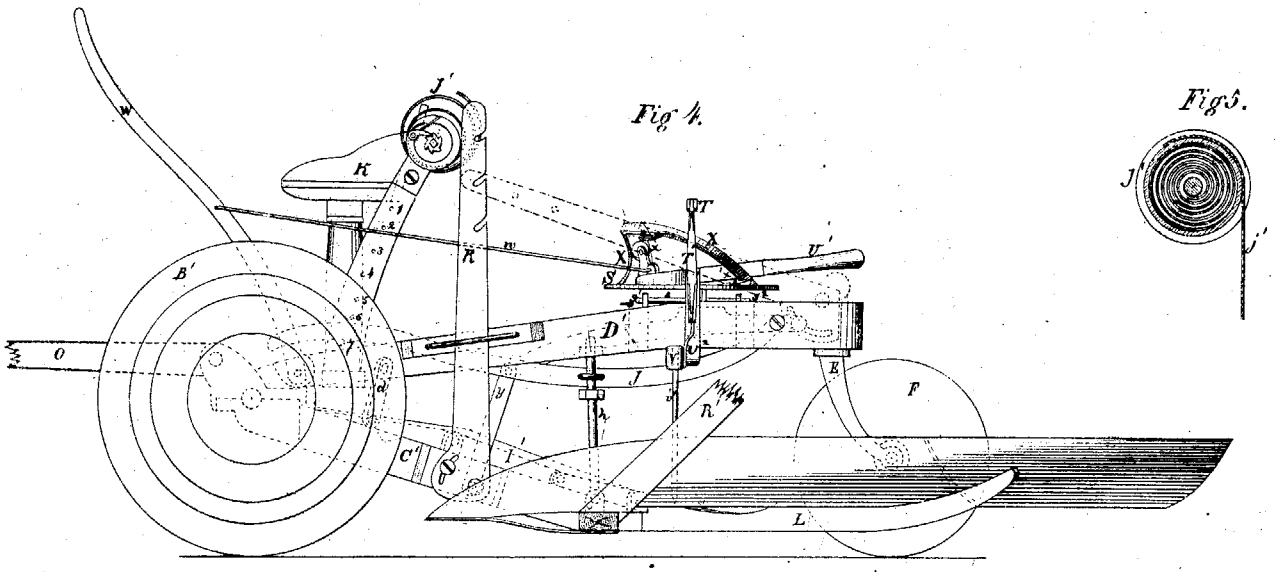
Witnesses.
Joe S. Peyton
Battis DeLong.
John P. Manny
by his Attys
Wm D. Baldwin 4 Sheets. Sheet 4.
J. P. Manny,
Harvester Rake.
No. 3581. Reissued. Aug. 3. 1869.
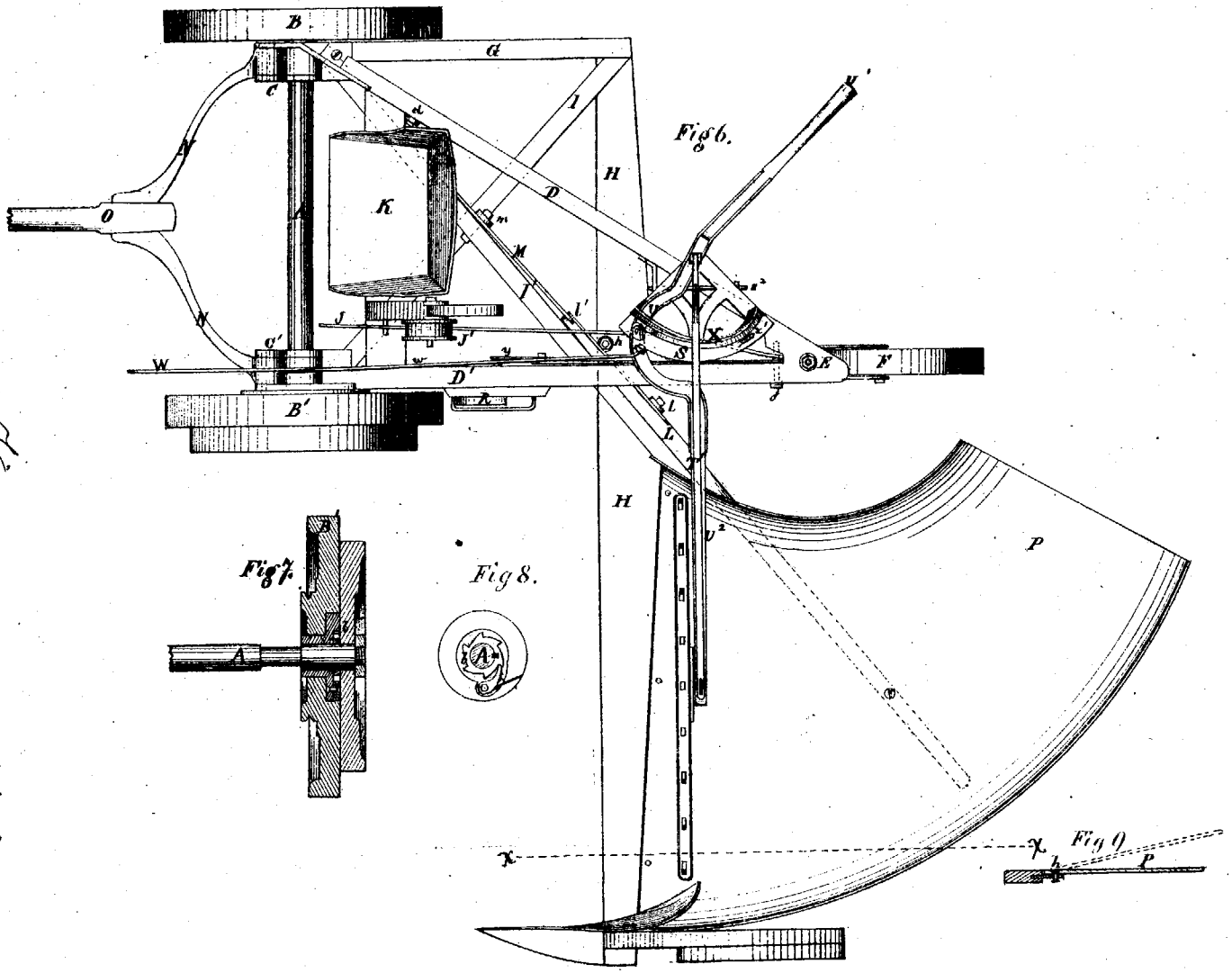
Witnesses,
Joel Keyton.
Battis De Long
John P. Manny
by his Atty
Wm D. Bishop

UNITED STATES PATENT OFFICE.

JOHN P. MANNY, OF ROCKFORD, ILLINOIS.

IMPROVEMENT IN HARVESTERS.

Specification forming part of Letters Patent No. 17,798, dated July 14, 1857; reissue No. 3,581, dated August 3, 1869.

DIVISION B.

*To all whom it may concern:*

Be it known that I, JOHN P. MANNY, of Rockford, in the county of Winnebago and State of Illinois, have invented certain new and useful Improvements in Harvesters, of which the following is a full, clear, and exact description:

The invention herein claimed relates to the use of my improved machine as a self-raking reaper. Its object is to allow the finger-beam freely to rise and fall, to conform to undulations in the ground, without disturbing the working of the rake; and the improvements herein claimed consist, first, in combining a platform vibrating about the main axle with a rake moving over the platform in the arc of a circle; second, in combining a platform and reel-supports, vibrating with the finger-beam about the main axle, and a rake moving over the platform in the arc of a circle; third, in combining a platform suspended from a frame vibrating about the main axle with a rake moving over the platform in a circular path; fourth, in combining a frame vibrating about the main axle, two driving-wheels, and a rake moving in the arc of a circle over a platform, suspended between the planes of the wheels, and vibrating about the main axle; fifth, in combining a vibrating frame, a platform vibrating with the finger-beam, and a rake moving over the platform in a circular path; sixth, in combining a vibrating platform, a rake supported between the driving-wheels, and coupling-piece connecting the platform and raking mechanism, which causes the rake to conform to the movements of the platform; seventh, in combining a rake with mechanism for adjusting it, together with the finger-beam and platform, so arranged as to be operated by the driver without stopping the machine.

In the accompanying drawings, Figure 1 represents a view, in perspective, of so much of a harvester embracing my improvements as is necessary to illustrate the invention herein claimed, as seen from the divider side thereof. Fig. 2 represents a similar view, on an enlarged scale, of the raking apparatus detached. Fig. 3 represents a view, in elevation, of the rake-supporting devices, detached, and seen from the front. Fig. 4 represents a view, in elevation, of the machine as seen from the divider side thereof. Fig. 5 represents a vertical section through the lifting-drum. Fig. 6 represents a plan or top view of the machine. Fig. 7 represents a vertical transverse section through the inner driving-wheel. Fig. 8 represents one of the backing-ratchets. Fig. 9 represents a vertical section through the platform, at the line *x x* of Fig. 6.

An axle, A, supported on wheels B B′, turns freely in boxes or bearings C C′, to each of which one end of a piece, D D′, is respectively secured. The wheels likewise turn freely on the axle, with which they are connected by suitable backing-ratchets *b*. (See Figs. 7 and 8.) The frame-pieces D D′ unite at their rear ends, and are supported by a caster-wheel, F, turning freely on its pivot or spindle E. Longitudinal side pieces G G′ are connected to the lower rear parts of the boxes C C′ in front, and are attached in rear to a finger-beam, H, projecting laterally beyond the wheels and frame. Diagonal braces I I′ pass from corner to corner of the quadrangular frame formed by the main axle, the projecting extension of the finger-beam, and the side pieces G G′, and brace these parts firmly, while allowing them to vibrate or be adjusted around the axle A, as hereinafter described. A lever, J, is pivoted at *j* to the frame-piece D′, and extends to a point near the conductor's seat K, likewise mounted on the frame D D′, so that the driver can readily operate the lever to raise or lower the finger-beam, which is suspended from the lever by a rod, *h*, which passes loosely through an eye on the lever, to allow the finger-beam vertical play without moving the lever. The tongue O is connected to hounds N, hinged to the boxes C C′.

When these machines are used for mowing, the finger-beam is lowered so as to move over, but in contact with, the ground, in order to cut close; but the friction produced by the dragging of the finger-beam is detrimental, by increasing the draft. This difficulty I obviate by mounting a spring-drum, J′, on a standard supported on the frame D, and connecting it by a cord or chain, *j*, with the lifting-lever J, from which the finger-beam is suspended. One end of a coiled spring is fastened to the axis, and the other to the periphery of the drum, which is also provided with a ratchet and pawl, so that the spring may be wound up to and held at any desired degree of tension. The tension of the spring regulates the lifting power applied to the lever J, and thus relieves the pressure of the finger-beam upon the ground, while allowing the crop to be closely cut.

For reaping, I attach a platform, P, to the finger-beam by hinges *p*, Fig. 9; but in raising or lowering this platform, I desire it always to retain the same horizontal position, or, in other words, to be raised and lowered in parallel lines, front and rear, which it would not do with the devices above described alone. To effect this object, therefore, I use a long lever or supporting-beam, L, which extends far under the platform, and its outer end is fastened to the platform. This beam L is hinged to the finger-beam at *l*, and its front end is pivoted, at *l′*, to one end of a lever, M, which has its fulcrum at *m* on the diagonal braces I I′, while its front end is connected by a link, *d*, (shown in dotted lines in Fig. 4,) with the frame D D′. The result of this arrangement is, that the supporting-piece L depresses the rear end of the platform as the finger-beam is raised by the lever J, and vice versa, the connection between the frame D D′ and the supporting-piece L forming a compound lever to effect this purpose, and thus both the front and rear of the platform are kept in a horizontal position, while they are raised or lowered to any desired cutting height. The reel-supports R R′ are, respectively, mounted on and vibrate with the divider and the frame G G′.

The operation of the machine will readily be understood from the foregoing description. The team is harnessed to the tongue, in the usual well-known way. The tongue, being pivoted to the boxes nearly in the line of the main axle, is free to vibrate up and down around said axle without affecting the movements of the other parts of the machine. The frame D D′ is, in like manner, pivoted to the boxes near the axle, and is also free to vibrate up and down around said axle. The frame G G′ is likewise connected with the boxes in which the main axle turns, and is free to vibrate up and down around said axle, to allow the finger-beam to conform to the undulations of the ground, over which it slides when mowing. As the frame G G′ is suspended by a link, *h*, from the lever J on the frame D, the driver can raise or lower the finger-beam at pleasure, or hold it at any desired elevation. When reaping, he can in like manner raise and lower the platform, at the same time keeping it horizontal by means of the lever M and its linked connections with the frame D D′. As the driver's seat is mounted on the frame D D′, the finger-beam and tongue can both vibrate up and down without rocking the seat back and forth on the axle. P is the platform, upon which the cut grain falls. It is flat near the finger-beam, but as it curves around rearward it becomes contracted in width and concave in form, until at its extreme rear end it is of a trough-shaped form, as seen in the drawings. The object of this mode of construction is, that the grain, as it is swept around by the rake, shall be gradually contracted between the sides of the platform, until, at the point of delivery, it shall be in a compact gavel, and ready for binding; and to prevent anything like hanging of the grain, the platform assumes its horizontal as well as vertical curvature, with a graduation that presents no injurious obstruction to the passing grain or stalks. A quadrant-shaped plate, S, is pivoted to the outer piece D of the frame by a shaft, *s*, whose journals $s^1$ $s^2$ are supported in boxes on said frame-piece, as seen in Figs. 2, 3, and 4, so that said plate may be raised or lowered on the frame. The center of this quadrant-shaped plate has a slot in it, so that it may pass in between fixed collars *t* on a shaft, T, that is supported in a box or bearing attached to the frame-piece D, the shaft T turning in said bearing as the rake is swept around over the platform. A curved or bent shank, U, is pivoted at *u* to the shaft T, so that said shank may move horizontally with the shaft, and also have a vertical movement on its shaft or pivot *u*. To one end of this curved shank U is attached a lever, $U^1$, by which the rake may be worked, and to its other end is fastened a bar, $U^2$, which extends to and is pivoted at the center of the rake-head V. From the top of the shaft T, to which it is hinged, extends a bar, T′, the extreme end of which is also hinged to an arm, *v*, fastened to the center of the rake-head. The length of this arm *v* is about the same as the distance between the pivot *u* and the top of the shaft T, to which the bars $U^2$ T′ are, respectively, hinged, so that said bars shall be parallel to each other; and as the rake is connected to these bars, it also, as it is raised and lowered, shall do so in parallel planes, and not in the arc of a circle, as it would do if it moved from or on one center alone. The maintenance of this parallel position of the rake as it rises and falls is important, for it will be observed that the rake is attached to a frame which remains at a uniform height above the ground, while the platform, with which it acts in concert, is connected with an adjustable frame, and as the platform must be raised or lowered to adapt it to the condition of the grain to be cut, so must the rake be raised or lowered to adapt itself to the platform; and as the platform is raised into a horizontal plane, so must the rake rise in a horizontal plane, to preserve its relative position thereto, and vice versa. The platform, as heretofore described, is contracted in width as it curves around and recedes from the finger-bar, and to adapt a rake to the sweeping or clearing of such a platform, the rake must, of course, have a contracting and elongating property, and to give it such a self-acting property, simplicity of construction and an avoidance of machinery to operate it are the main conditions of its value and utility. To effect this object I pivot the outer teeth $v'$ of the rake to the head V, so that as the teeth pass around in contact with the gradually-approaching sides of the platform, they shall swing in toward the center of the rake, as shown in red lines in Fig. 1, and thus conform to the shape of the platform, and gradually bring the stalks into a compact form, until, at the end of the platform, they are delivered in a gavel on the ground, and when the rake rises to return from the next operation, the teeth $v'$, by their own gravity, assume a perpendicular position again, and form a rake that will extend clear across the wider portions of the platform, and thus the rake becomes a self-contracting and elongating one, to suit the peculiar shape or form of the platform. To the shank U is connected one end of a rod, $w$, the other end of which is connected to a lever, W, which is placed in convenient position for the conductor or operator, so that from his seat or stand K he may operate the rake, which is guided in its motions in the following manner: On a raised piece, X, secured to the plate S, is a cam-ledge, $x$, upon which runs a small friction-roll, $x'$, that is attached to the shank U. When the rake is sweeping off the gavel, the roll $x'$ runs against the under side of the cam-ledge $x$, which prevents the rake from rising, and when the rake has passed out to the end of the platform and delivered the gavel, the shank U runs over a cam-plane, X′, on the plate S, which raises up said shank. The friction-roll $x'$, having then arrived at the end of the cam-ledge, is raised, with the shank U, onto the top of said ledge, and as the rake returns to sweep off the next gavel, the said roll runs on top of the ledge, keeping the rake above the falling grain, until it drops perpendicularly on the front of the platform again.

So much of the operation of the rake as involves its mere traversing movement over the platform is simple enough, but the platform has to be raised or lowered to the extent of some twelve or fifteen inches, and it is obvious that the rake must also have a due extent of vertical movement to keep in working position with the platform, and it would not do for the conductor, who must drive his horses, rake off the cut grain, and adjust the cutters, both as to their height and for passing any obstruction, to be obliged also to adjust the rake every time he raises or lowers his platform; and to cause the rake to follow automatically the raising and lowering of the platform I arrange as follows: G G′ are pieces hinged to the rear under sides of the boxes C C′ on the main axle, and their other ends are attached to the finger-bar H, and these pieces are further supported and strengthened by diagonal braces I I′. These several pieces thus put together and hinged to the bearings C constitute what I term the adjustable frame of the machine. A lever, J, connected with the frame D D′, extends into a position convenient for the conductor to operate, and to this lever are suspended the finger-bar and its connecting-frame by a rod, $h$, so that by means of said lever the finger-bar may be raised or lowered at pleasure. To the frame-piece G′ is connected a rod, $y$, and its upper end is fastened to a lever, Y, which has its fulcrum in the frame D′. A flange, $y^1$, on this lever takes into a slot cut in a stud, $y^2$, arranged on the under side of the plate S, so that every time the lever Y is raised the plate S will rise, and when the lever is lowered the plate also lowers, and with the plate also rises and falls the rake with all its operative parts.

Now, the piece G′, it will be remembered, is a part of the adjustable frame, and the lever Y is connected to G′, and, consequently, every time the platform is raised or lowered on its frame the rake is correspondingly raised or lowered on its frame, and thus the two work together in perfect harmony, although one is arranged on a constantly adjusting and adjustable frame, and the other on a rigid or non-adjusting frame.

The lever J traverses closely to a standard, V, in which is a series of holes, 1, 2, 3, &c., and to which it may be held by a pin at its lowest range, while it can be raised above that line at pleasure to pass intervening obstacles.

What I claim herein as new, and desire to secure by Letters Patent, is—

1. The combination, with a platform vibrating about the main axle, of a rake moving over the platform in the arc of a circle, the combination being and operating substantially as set forth.

2. The combination of a platform and reel-supports vibrating about the main axle with a rake moving over the platform in the arc of a circle, the combination being and operating substantially as set forth.

3. The combination of a rake with a platform suspended from a frame vibrating about the main axle, the combination being and operating substantially as set forth.

4. The combination of a frame vibrating about the main axle, two driving-wheels, and a rake moving in the arc of a circle over a platform suspended between the planes of the wheels, the combination being and operating substantially as set forth.

5. The combination of a vibrating frame, a platform vibrating with the finger-beam around the main axle, and a rake moving the platform in a circular path, the combination being and operating substantially as set forth.

6. The combination of a platform vibrating about the main axle, a rake supported between the planes of the wheels, and a coupling-piece interposed between the platform and raking mechanism, which secures the conformity of the movements of the rake with those of the platform in passing over uneven ground, the combination being and operating substantially as set forth.

7. The combination of a rake with mechanism for adjusting the rake, finger-beam, and platform, so arranged that the driver can operate the adjusting mechanism without stopping the machine, substantially as set forth.

JOHN P. MANNY.

Witnesses:
ELIAS COSPER,
W. C. BLINN.